United States Patent [19]
Swartz et al.

[11] Patent Number: 5,948,458
[45] Date of Patent: Sep. 7, 1999

[54] METHOD FOR PREVENTING SPOILAGE, RANCIDITY, AND OFF-COLOR BY USING A TRICALCIUM PHOSPHATE ULTRAVIOLET LIGHT INHIBITOR

[75] Inventors: William E. Swartz, Cranbury; Clark G. Hartford, Jamesburg, both of N.J.

[73] Assignee: Rhodia Inc., Cranbury, N.J.

[21] Appl. No.: 08/992,265

[22] Filed: Dec. 17, 1997

Related U.S. Application Data

[60] Provisional application No. 60/032,445, Dec. 19, 1996.

[51] Int. Cl.$^6$ ................................. A21D 4/00; A23L 2/00
[52] U.S. Cl. ........................ 426/321; 426/323; 426/324; 426/330.6
[58] Field of Search ..................... 426/329, 321, 426/322, 323, 330.6, 601; 359/361

[56] References Cited

U.S. PATENT DOCUMENTS

| | | | |
|---|---|---|---|
| 3,387,925 | 6/1968 | Vanstrom et al. | 23/109 |
| 3,692,543 | 9/1972 | Powell | 99/144 |
| 4,324,772 | 4/1982 | Conn et al. | 423/309 |
| 4,609,553 | 9/1986 | Zboralski et al. | 426/36 |
| 4,891,198 | 1/1990 | Ackilli et al. | 423/308 |
| 5,141,979 | 8/1992 | George et al. | 524/398 |
| 5,149,552 | 9/1992 | Vidal et al. | 426/321 |
| 5,275,806 | 1/1994 | Gbogi et al. | 424/59 |
| 5,292,544 | 3/1994 | Coutant et al. | 426/573 |

OTHER PUBLICATIONS

Database abstract (Dialog) for Journal of the Ceramic Society of Japan. vol. 98. No. 2. pp. 204–207. Authors: Ashizuka et al, 1990.

*Primary Examiner*—Anthony J. Weier
*Attorney, Agent, or Firm*—Andrew M. Solomon

[57] ABSTRACT

Food-compositions that are high in unsaturated fats and lipids which renders them prone to a short shelf life due to the development of rancid taste and off-color from the exposure to ultraviolet light are protected therefrom through the addition of an effective amount of tricalcium phosphate. The UV blocking agent can also be incorporated in the clear plastic packaging, glass and film wrap thereby shielding the food therein from the ultraviolet light in this manner.

6 Claims, No Drawings

METHOD FOR PREVENTING SPOILAGE, RANCIDITY, AND OFF-COLOR BY USING A TRICALCIUM PHOSPHATE ULTRAVIOLET LIGHT INHIBITOR

This application claims the benefit under 35 U.S.C. Section 119(e) of United States Provisional Application Ser. No. 60/032,445, filed on Dec. 19,1996.

FIELD OF THE INVENTION

The present invention relates generally to compositions useful in the prevention of spoilage of food products. More specifically, the invention relates to food ingredients which guard against the development of off-color, off-tastes and oxidative rancidity in oil-based foods.

BACKGROUND OF THE INVENTION

The are many foods and food comestibles that contain unsaturated lipids and fats as a major component thereof. Salad dressings, mayonnaise, oils used in frying and other like compositions are rich in unsaturated fats which, by their very nature, present problems due to the development of off-tastes tastes, off-colors and oxidative rancidity during storage. Whereas most if not all of such unsaturated lipid food compositions are vacuum-packed in air tight containers, the development of these undesirable characteristics during storage has led to the current belief that light in some fashion may likely be responsible for these changes. Consumers however, like to be able to see the product they are purchasing and hence most of these products are unfortunately packaged in clear plastic or glass bottles and wraps.

Light is wave energy that is commonly divided into spectral regions. The term wavelength refers to the distance between the peaks of successive light waves and the human eye can really only see light that is comprised of longer wavelength energy. Light that is unusable to the human eye also exhibits varied characteristics. Ultraviolet light refers to the spectrum of wavelengths that fall between infrared energy and x-rays. At higher energy levels, i.e., the shorter wavelengths, ultraviolet light is well-known for its ability to break inter-and intramolecular bonds of compounds such as nucleic acids, proteins, fats and carbohydrates.

Unsaturated fats are a major component of the large number of food comestibles such as salad dressings, mayonnaise, snack foods and the like that exhibit the problems of off-taste and color development during storage. Without being bound to any theory, it is believed that the carbon to carbon double bonds of these unsaturated lipids are stuck by ultraviolet light energy of the spectrum and are oxidized which results in the off color and rancidity. It would be advantageous then, to provide these unsaturated lipid containing foods with a UV-light protectant which will prevent the oxidation of the double bonds by the UV-light.

U.S. Pat. No. 3,387,925 to Vanstrom et al. discloses a method for the preparation of tricalcium phosphate wherein a smaller particle size is achieved by controlling the reaction temperature and final pH during precipitation. The product produced in this manner does not require drying or milling.

U.S. Pat. No. 4,324,772 to Conn et al. discloses a method for the preparation of tricalcium phosphate/hydroxyapatite in large volumes. The process consists of a two-stage reactor in which a slurry of aqueous calcium oxide is mixed with an aqueous phosphoric acid solution in the first stage. The reaction is allowed to proceed under vigorous agitation until the viscosity of the mixture becomes minimal. Agitation is continued until the crystals precipitate, are collected and dried.

U.S. Pat. No. 4,891,198 to Ackilli et al. discloses a third method for the preparation of a rapidly soluble tricalcium phosphate in the absence of hydroxyapatite. Calcium hydroxoxide is rapidly added to phosphoric acid while the pH and temperature of the reaction are controlled. The final pH must be maintained between 8 and 12 while the temperature is kept at about 160° F. As the crystals precipitate, the slurry is spray or freeze dried.

U.S. Pat. No. 5,149,552 to Vidal discloses compositions containing titanium dioxide ($T_1O_2$) and tricalcium citrate in mineral oil which act as ultraviolet light blockers. U.S. Pat. No. 5,208,372 to Vidal discloses the use of tri-sodium citrate in a number of mineral oil based compositions that are also effective as an ultraviolet light blocker.

U.S. Pat. No. 5,275,806 to Gbogi et al. discloses topical compositions for protection of the skin against UV-light which comprise effective amounts of the reaction product produced by mixing a calcium compound such as calcium hydroxide ($Ca(OH)_2$), calcium carbonate ($CaCO_3$) or calcium oxide ($CaO_2$) with citric acid in a range of calcium: citrate molar ratios of 2.5:2 to 2.95:2. The calcium:citrate reaction compound is incorporated in a topical carrier vehicle comprising an emollient, a solvent, a humectant and a filler powder.

U.S. Pat. No. 5,292,544 to Contant et al. discloses the use of tricalcium phosphate in low fat and non-fat food products to improve the emulsion and lubricous characteristics therein. Whereas many low fat food products incorporate various hydrocolloids and gums to replace the body and texture of the food that was lost when the fat was removed, these also allegedly result in a "stringiness" or "gloppiness" mouth feel that is not entirely desirable. Tricalcium phosphate is allegedly used to alleviate these organoleptic difficulties.

Finally, U.S. Pat. No. 3,692,543 to Powell discloses the use of tricalcium phosphate as an emulsifier to improve the texture and mouthfeel of high fat foods such as mayonnaise and mayonnaise type dressings in which the eggs are removed to cut down on the fat.

There is a need then for a food additive that is both safe for human consumption and useful in relatively small amounts for the prevention of the ultraviolet light induced oxidative reduction of unsaturated fats or lipids in foods containing them. Moreover, there is a need for the protection of such fats and lipids from UV-light induced oxidative reduction using a compounds(s) that is effective in relatively small amounts so as not to affect the food's taste or other organolistic characteristic

SUMMARY OF THE INVENTION

Foods and food ingredients high in unsaturated fat content are protected from spoilage that may result during storage that is induced by exposure of the food product to the ultraviolet light portion of the light energy spectrum. The carbon-to-carbon double bonds of the unsaturated fats and lipids are protected from oxidative reduction by the UV light throughout the incorporation of calcium phosphate compounds either directly into the food product itself or in the food coatings and package wrap.

DETAILED DESCRIPTION OF THE INVENTION

Since ultraviolet light is a well-known catalyst for the oxidative reduction of many unsaturated compounds, it would seem logical that the exposure of unsaturated lipidand fat-containing foods to ultraviolet light during storage would result in the same photo-induced reaction of these compounds. This then results in formation of off-color and rancid taste in the food commonly regarded as spoilage. Whereas other compounds such as titanium oxide and tricalcium citrate are known UV-light blockers, these are not approved for use in foods nor are they classified as GRAS (generally recognized as safe) by the FDA. Tricalcium phosphate on the other hand, is approved for use in foods and other materials such as film wraps and containers in which foods are generally packaged.

Tricalcium phosphate $(Ca_3(PO_4)_2)$ can be produced thermally but is usually produced through precipitation as the hydroxyapatite with the approximate formula $Ca_5OH(PO_4)_3$. It is a known anticaking agent, buffer, nutrient supplement, plastics stabilizer and meat tenderizer. It has been surprisingly and unexpectedly found that when incorporated in small amounts in foods rich in highly unsaturated fats and lipids, tricalcium phosphate serves as an excellent ultraviolet light blocking agent which prevents the oxidative reduction of the compounds and the rancidity resulting therefrom. The compound can also be formulated with plastic polymers which are then processed as plastic bottles, plastic wrap and other containment means. In this manner, the unsaturated fat compositions may be protected from oxidative reduction without actually incorporating the compound into the food itself.

When the tricalcium phosphate is incorporated directly into the salad dressing, mayonnaise, sauce or other topping or coating, it can be added in a small but effective amount of from about 1.0% to about 10.0% by weight of the total weight of the food composition. Preferably, the compound will be added in an amount of from about 1.2% to about 5.0% and most preferably in an amount of from 1.5% to about 3.0%. These amounts can than be incorporated directly into any conventional salad dressing, mayonnaise or other dressing recipe. The UV blocker can-also be incorporated as a dry powder into the flavor mixes used to coat and flavor snack foods such as potato chips, Doritoes®, cheese puffs, tortilla chips and the like which are cooked in hot oil and then dusted with the flavor coating. Similar amounts can be incorporated into the polymer plastics formulation for the manufacture of UV-resistant bottles and wraps as is known in the art.

In addition to the ultra-violet light protectant properties, the addition of tricalcium phosphate to foods and food compositions that are sticky or tacky by nature such as bakery batters and dough also reduces the sticky texture thereof.

The following example is provided to more specifically delineate, for comparative purposes, the surprising and unexpected results obtained using the functional properties of the compositions of the present invention. The example is for illustrative purposes only however, and it is recognized that minor changes or alternatives can be made therein which are not contemplated or disclosed therein. It is understood however that to the extent any such changes do not materially alter the method or result obtained thereby, they are to be considered as falling within the spirit and scope of the invention as recited by the following claims.

EXAMPLE 1

The degree to which tricalcium phosphate could act as a UV-resistant agent was compared to that of titanium dixodide and tricalcium citrate, two well known UV blocking agents. Samples of each (330 g) were dissolved in light mineral oil and the degree of UV light absorbed was measured using a 1.0 cm UV quartz cell in a standard spectrophotometer with ultraviolet wavelengths of from 400 nm to 200 nm. Pure mineral oil alone was used as a reference. The comparative results are summarized in the table below.

TABLE 1

UV Blocking of Tri-Calcium Phosphate, Tri-Calcium Titanium Dioxide, and Sodium Citrate at various partical sizes in light mineral oil

| Sample ID | Test Sample | Partical Size In microns | Conc. % (w/w) | Approximate Density | 300 nm Abs | 300 nm Abs | 300 nm Avg. Abs |
|---|---|---|---|---|---|---|---|
| TCC | #1 | 2.2u Avg | 0.10 | | 1.2634 | 1.2181 | 1.2408 |
| TCC | #2 | 9u Avg | 0.10 | | 0.7937 | 0.7907 | 0.7922 |
| TCC | #3 | 19u Avg | 0.10 | | 0.6094 | 0.6034 | 0.6064 |
| TCC | As is | 60–70u Avg | 0.10 | 3.3 | 0.6302 | 0.6255 | 0.6278 |
| TCP | #1 | 1.316u Avg | 0.10 | | 1.5034 | 1.4437 | 1.4736 |
| TCP | #2 | 1.356u Avg | 0.10 | | 1.4364 | 1.4218 | 1.4291 |
| TCP | #3 | 2.763u Avg | 0.10 | | 1.2030 | 1.2060 | 1.2045 |
| TCP | As is | 103.1u Avg | 0.10 | 3.1 | 0.9207 | 0.8661 | 0.8934 |
| TiO2 B.A. | #1 | 1.426u Avg | 0.10 | | 4.6810 | 4.6810 | 4.6810 |
| TiO2 B.A. | As is | 1.750u Avg | 0.10 | 4.2 | 3.0017 | 2.9665 | 2.9841 |
| TiO2 U.P. | As is | <45u | 0.10 | 4.2 | 1.6131 | 1.6615 | 1.6373 |
| TSC | #1 | 11.6u Avg | 0.10 | | 0.3570 | 0.3235 | 0.3403 |
| TSC | #2 | 8.3u Avg | 0.10 | | 0.3321 | 0.3320 | 0.3321 |
| TSC | As is | 80u Avg | 0.10 | 1.7 | 0.1551 | 0.1534 | 0.1542 |

TCC = Calcium Citrate as per U.S. Pat. No. 5,149,552 and U.S. Pat. No. 5,206,372
TCP = Calcium Phosphate Tribasic, Powder, Baker Anlayzed, Reagent Cat #14360-01 Lot #G38716
TiO2 B.A. = Titanium Dioxide, Powder, Baker Analyzed, Cat #4162-01, Lot #G323398
TiO2 U.P. = Titanium Dioxide, Powder, "Ultra Pure" - 100% pass 400 mesh
TSC = Sodium Citrate, Dihydrate, powder, Baker analyzed FCC. Cat #3650-01, Lot #F31719

As indicated by the measured values at 300 nm. WV-absorbance, tricalcium phosphate was as good, if not superior to titanium dioxide, calcium citrate and sodium citrate in blocking the UV-transmittance.

What is claimed is:

1. A method for the prevention of spoilage, rancidity or off-color in a liquid food product containing unsaturated lipids and fats caused by exposure of the liquid food product to ultraviolet light comprising the step of adding to said food product an ultraviolet absorbing effective amount of tricalcium phosphate.

2. The method of claim 1 wherein said tricalcium phosphate is incorporated in said food product in an amount of from about 1.0% to about 10.0% by weight of the total weight of the food product.

3. The method of claim 2 where said tricalcium phosphate is incorporated in said food product in an amount of from about 1.2% to about 5.0% by weight of the total weight of the food product.

4. The method of claim 3 wherein said food product is selected from the group consisting of salad dressings, mayonnaise, snack food flavor coatings, spreads and toppings.

5. A method for the prevention of spoilage, rancidity or off-color in a food product containing unsaturated lipids and fats which is maintained in glass packaging caused by exposure of the food product to ultraviolet light comprising the step of incorporating in said glass packaging an ultraviolet absorbing effective amount of tricalcium phosphate wherein said tricalcium phosphate is incorporated in said class packaging in an amount of from about 1.0% to about 10% by weight of the total weight of the packaging.

6. The method of claim 5 wherein said tricalcium phosphate is incorporated in said glass packaging in an amount of from about 1.2% to about 5.0% by weight of said packaging.

* * * * *

UNITED STATES PATENT AND TRADEMARK OFFICE
CERTIFICATE OF CORRECTION

Page 1 of 1

PATENT NO. : 5,948,458
DATED : September 7, 1999
INVENTOR(S) : William E. Swartz and Clark G. Hartford It is certified that error appears in the above-identified patent and that said Letters Patent is hereby corrected as shown below:

Column 4,
Line 62, please delete "WV-absorbance" and insert "UV-absorbance."
Claim 5, line 8, please delete "class" and insert "glass."

Signed and Sealed this

Tenth Day of July, 2001

*Attest:*

*Attesting Officer*

NICHOLAS P. GODICI
*Acting Director of the United States Patent and Trademark Office*